United States Patent
Takayama et al.

(10) Patent No.: US 10,294,157 B2
(45) Date of Patent: May 21, 2019

(54) CEMENT ADDITIVE, CEMENT COMPOSITION, AND CEMENT ADDITIVE RAW MATERIAL

(71) Applicant: Nippon Shokubai Co., Ltd., Osaka (JP)

(72) Inventors: Takeshi Takayama, Osaka (JP); Marie Kawamura, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 15/754,711

(22) PCT Filed: Jul. 7, 2016

(86) PCT No.: PCT/JP2016/070148
§ 371 (c)(1),
(2) Date: Feb. 23, 2018

(87) PCT Pub. No.: WO2017/033590
PCT Pub. Date: Mar. 2, 2017

(65) Prior Publication Data
US 2018/0251401 A1 Sep. 6, 2018

(30) Foreign Application Priority Data

Aug. 25, 2015 (JP) ................................ 2015-165773
Aug. 25, 2015 (JP) ................................ 2015-165774

(51) Int. Cl.
| | | |
|---|---|---|
| C04B 24/26 | (2006.01) |
| C04B 28/02 | (2006.01) |
| C08F 220/06 | (2006.01) |
| C08F 220/28 | (2006.01) |
| C08F 290/06 | (2006.01) |
| C04B 40/00 | (2006.01) |
| C04B 24/12 | (2006.01) |
| C04B 103/46 | (2006.01) |

(52) U.S. Cl.
CPC ........ *C04B 24/2647* (2013.01); *C04B 24/122* (2013.01); *C04B 28/02* (2013.01); *C04B 40/0039* (2013.01); *C08F 220/06* (2013.01); *C08F 220/28* (2013.01); *C08F 290/06* (2013.01); *C04B 2103/46* (2013.01)

(58) Field of Classification Search
CPC . C04B 24/2647; C04B 28/02; C04B 40/0039; C04B 24/122; C04B 2103/46; C08F 220/06; C08F 220/28; C08F 290/06
USPC .......................................................... 524/2
See application file for complete search history.

(56) References Cited

U.S. PATENT DOCUMENTS

| | | | | |
|---|---|---|---|---|
| 5,707,445 A | * | 1/1998 | Yamato | ................. C04B 24/165 106/724 |
| 2004/0005305 A1 | | 1/2004 | Spivey-Krobath | |
| 2006/0249056 A1 | | 11/2006 | Shiba | |
| 2014/0005305 A1 | * | 1/2014 | Sagawa | ............... C04B 24/2647 524/5 |

FOREIGN PATENT DOCUMENTS

| | | |
|---|---|---|
| CN | 101289293 A | 10/2008 |
| CN | 103724557 A | 4/2014 |
| EP | 2258668 A1 | 12/2010 |
| JP | 62-070250 A | 3/1987 |
| JP | 07-223852 A | 8/1995 |
| JP | 08-012396 A | 1/1996 |
| JP | 08-059323 A | 3/1996 |
| JP | 4409309 B | 11/2009 |
| JP | 4459358 B2 | 2/2010 |
| JP | 2011-088587 A | 5/2011 |
| JP | 2011-088757 A | 5/2011 |
| JP | 2011-116587 A | 6/2011 |
| JP | 4963046 B2 | 4/2012 |
| JP | 2012-166978 A | 9/2012 |
| JP | 2013-133241 A | 7/2013 |
| JP | 5705423 B2 | 4/2015 |
| JP | 2016-124719 A | 7/2016 |
| KR | 10-2008-0081670 A | 9/2008 |
| WO | 2012/124716 A1 | 9/2012 |

OTHER PUBLICATIONS

International Search Report for PCT/JP2016/070148 dated Sep. 20, 2016.

* cited by examiner

*Primary Examiner* — Michael Bernshteyn
(74) *Attorney, Agent, or Firm* — Pearne & Gordon LLP

(57) ABSTRACT

Provided is a cement additive that can suppress the production of Glauber's salt as a by-product, and that can express excellent retention when turned into a cement composition. Also provided is a cement composition including such cement additive. Also provided is a raw material for a cement additive to be used in such cement additive. The cement additive of the present invention includes: a polycarboxylic acid-based copolymer (A) having a structural unit (I) derived from an unsaturated polyalkylene glycol-based monomer (a) represented by the specific general formula (1) and a structural unit (II) derived from an unsaturated carboxylic acid-based monomer (b) represented by the specific general formula (2); and an alkanolamine compound (B), in which a content of the structural unit (II) with respect to a total amount of the structural unit (I) and the structural unit (II) is 60 mol % or less.

14 Claims, No Drawings

CEMENT ADDITIVE, CEMENT COMPOSITION, AND CEMENT ADDITIVE RAW MATERIAL

TECHNICAL FIELD

The present invention relates to a cement additive, a cement composition, and a raw material for a cement additive.

BACKGROUND ART

A cement composition, such as mortar or concrete, generally contains cement, an aggregate, and water, and preferably further contains a cement additive that functions as a water-reducing agent or a cement additive that functions as a retaining agent for improving its fluidity to reduce its water content (for example, Patent Literature 1).

It can be said that the cement additive that functions as a retaining agent is an additive that can express more excellent retention as a change in fluidity of the cement composition with time becomes smaller.

In addition, when a specific polycarboxylic acid-based copolymer is used as a polymer component of any such cement additive, at the time of the production of the copolymer, in general, a persulfate is used as an initiator and NaOH is used in the neutralization of the persulfate after the polymerization of the copolymer. However, when NaOH used in the neutralization after the polymerization, Glauber's salt ($Na_2SO_4$) is produced as a by-product, and under low temperature, the Glauber's salt crystallizes to cause a trouble, such as the clogging of various apparatus. Meanwhile, when the neutralization is not performed after the polymerization so that the production of the Glauber's salt as a by-product may be suppressed, a problem in that the acidity of the cement additive strengthens and hence various apparatus are corroded occurs.

CITATION LIST

Patent Literature

[PTL 1] JP 2013-133241 A

SUMMARY OF INVENTION

Technical Problem

An object of the present invention is to provide a cement additive that can suppress the production of Glauber's salt as a by-product, and that can express excellent retention when turned into a cement composition. Another object of the present invention is to provide a cement composition including such cement additive. Still another object of the present invention is to provide a raw material for a cement additive to be used in such cement additive.

Solution to Problem

A cement additive according to one embodiment of the present invention includes:
a polycarboxylic acid-based copolymer (A) having a structural unit (I) derived from an unsaturated polyalkylene glycol-based monomer (a) represented by the general formula (1) and a structural unit (II) derived from an unsaturated carboxylic acid-based monomer (b) represented by the general formula (2); and
an alkanolamine compound (B),
in which a content of the structural unit (II) with respect to a total amount of the structural unit (I) and the structural unit (II) is 60 mol % or less:

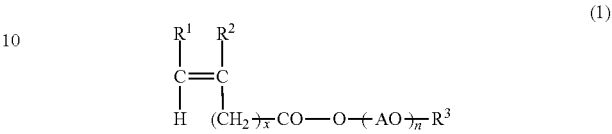

in the general formula (1), $R^1$ and $R^2$ may be identical to or different from each other, and each represent a hydrogen atom or a methyl group, $R^3$ represents a hydrogen atom or a hydrocarbon group having 1 to 30 carbon atoms, AO represents an oxyalkylene group having 2 to 18 carbon atoms, n represents an average number of moles added of oxyalkylene groups each represented by AO, and n represents from 1 to 90, and x represents an integer of from 0 to 2;

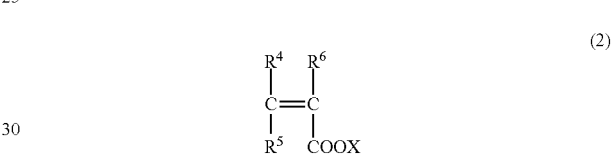

in the general formula (2), $R^4$ to $R^6$ may be identical to or different from one another, and each represent a hydrogen atom, a methyl group, or a $—(CH_2)_zCOOM$ group, and the $—(CH_2)_zCOOM$ group may form an anhydride with a $—COOX$ group or any other $—(CH_2)_zCOOM$ group, z represents an integer of from 0 to 2, M represents a hydrogen atom, an alkali metal, an alkaline earth metal, an ammonium group, an organic ammonium group, or an organic amine group, and X represents a hydrogen atom, an alkali metal, an alkaline earth metal, an ammonium group, an organic ammonium group, or an organic amine group.

In one embodiment, the content of the structural unit (II) with respect to the total amount of the structural unit (I) and the structural unit (II) is from 1.0 mol % to 57 mol %.

In one embodiment, the content is from 10 mol % to 40 mol %.

In one embodiment, a content of a total amount of the polycarboxylic acid-based copolymer (A) and the alkanolamine compound (B) in the cement additive is from 50 wt % to 100 wt %.

In one embodiment, the content is from 95 wt % to 100 wt %.

In one embodiment, a ratio of the alkanolamine compound (B) to the polycarboxylic acid-based copolymer (A) is from 1 wt % to 10,000 wt %.

In one embodiment, the ratio is from 5 wt % to 300 wt %.

In one embodiment, the ratio is from 10 wt % to 150 wt %.

In one embodiment, a weight-average molecular weight of the polycarboxylic acid-based copolymer (A) is 10,000 or more.

In one embodiment, the weight-average molecular weight is from 20,000 to 300,000.

In one embodiment, n in the general formula (1) represents from 3 to 60.

A cement composition according to one embodiment of the present invention includes the cement additive of the present invention.

A raw material for a cement additive according to one embodiment of the present invention includes the polycarboxylic acid-based copolymer (A), and the raw material is used in the cement additive.

A raw material for a cement additive according to one embodiment of the present invention includes the alkanolamine compound (B), and the raw material is used in the cement additive.

Advantageous Effects of Invention

According to the present invention, the cement additive that can suppress the production of Glauber's salt as a by-product, and that can express excellent retention when turned into a cement composition can be provided. The cement composition including such cement additive can also be provided. The raw material for a cement additive to be used in such cement additive can also be provided.

DESCRIPTION OF EMBODIMENTS

In this description, the expression "(meth)acrylic" means "acrylic and/or methacrylic", the expression "(meth)acrylate" means "acrylate and/or methacrylate", the expression "(meth)allyl" means "allyl and/or methallyl", and the expression "(meth)acrolein" means "acrolein and/or methacrolein". In addition, in this description, the expression "acid (salt)" means "an acid and/or a salt thereof". As the salt, there are given, for example, alkali metal salts and alkaline earth metal salts, and specifically, there are given, for example, a sodium salt and a potassium salt. In addition, in this description, the expression "weight" may be replaced with the expression "mass" that has heretofore been generally in common use as the unit of a weight. Conversely, in this description, the expression "mass" may be replaced with the expression "weight" that has been in common use as an SI unit representing a weight.

<<Cement Additive>>

A cement additive of the present invention includes: a polycarboxylic acid-based copolymer (A) having a structural unit (I) derived from an unsaturated polyalkylene glycol-based monomer (a) represented by the general formula (1) and a structural unit (II) derived from an unsaturated carboxylic acid-based monomer (b) represented by the general formula (2); and an alkanolamine compound (B).

The cement additive of the present invention may include any appropriate other component except the polycarboxylic acid-based copolymer (A) and the alkanolamine compound (B) to the extent that the effects of the present invention are not impaired.

The polycarboxylic acid-based copolymers (A) may be used alone or in combination thereof.

The alkanolamine compounds (B) may be used alone or in combination thereof.

The cement additive of the present invention includes the polycarboxylic acid-based copolymer (A), and hence can express excellent retention when turned into a cement composition.

The cement additive of the present invention includes the alkanolamine compound (B), and hence can suppress the production of Glauber's salt as a by-product.

Here, the inventors have found that when the content (sometimes referred to as "acid amount") of the structural unit (II) with respect to the total amount of the structural unit (I) and the structural unit (II) in the polycarboxylic acid-based copolymer (A) in the cement additive of the present invention is not adjusted, the suppressing effect on the production of Glauber's salt as a by-product cannot be sufficiently expressed. In view of the foregoing, the inventors have made investigations on the acid amount optimum for sufficient expression of the suppressing effect on the production of Glauber's salt as a by-product, and as a result, have conceived that the acid amount is preferably set to 60 mol % or less.

The content of a total amount of the polycarboxylic acid-based copolymer (A) and the alkanolamine compound (B) in the cement additive of the present invention is preferably from 50 wt % to 100 wt %, more preferably from 70 wt % to 100 wt %, still more preferably from 90 wt % to 100 wt %, particularly preferably from 95 wt % to 100 wt %, most preferably substantially 100 wt %. That is, the cement additive of the present invention is most preferably formed of the polycarboxylic acid-based copolymer (A) and the alkanolamine compound (B). When the content of the total amount of the polycarboxylic acid-based copolymer (A) and the alkanolamine compound (B) in the cement additive of the present invention falls within the range, there can be provided a cement additive that can further suppress the production of Glauber's salt as a by-product, and that can express more excellent retention when turned into a cement composition.

The content of the cement additive of the present invention with respect to the cement composition is preferably from 0.0001 wt % to 10 wt %, more preferably from 0.001 wt % to 5 wt %, still more preferably from 0.003 wt % to 3 wt %, even still more preferably from 0.005 wt % to 1 wt %, even yet still more preferably from 0.01 wt % to 0.7 wt %, particularly preferably from 0.01 wt % to 0.5 wt %, most preferably from 0.01 wt % to 0.3 wt %. When the content of the cement additive of the present invention with respect to the cement composition falls within the range, the production of Glauber's salt as a by-product can be further suppressed, and more excellent retention can be expressed. When the content of the cement additive of the present invention with respect to the cement composition is less than 0.0001 wt %, the cement additive of the present invention may hardly suppress the production of Glauber's salt as a by-product, and may hardly express excellent retention.

The ratio of the alkanolamine compound (B) to the polycarboxylic acid-based copolymer (A) in the cement additive of the present invention is, as a lower limit value, preferably 1 wt % or more, more preferably 5 wt % or more, still more preferably 10 wt % or more, even still more preferably 15 wt %, even yet still more preferably 20 wt % or more, particularly preferably 30 wt % or more, most preferably 50 wt % or more, and is, as an upper limit value, preferably 10,000 wt % or less, more preferably 1,000 wt % or less, still more preferably 500 wt % or less, even still more preferably 300 wt % or less, even yet still more preferably 200 wt % or less, particularly preferably 150 wt % or less, most preferably 100 wt % or less. When the ratio of the alkanolamine compound (B) to the polycarboxylic acid-based copolymer (A) in the cement additive of the present invention is adjusted within the range, the cement additive of the present invention can express the following effects: the cement additive can further suppress the production of Glauber's salt as a by-product, and can express more excellent retention.

<Polycarboxylic Acid-Based Copolymer (A)>

The polycarboxylic acid-based copolymer (A) in the cement additive of the present invention contains the structural unit (I) derived from the unsaturated polyalkylene glycol-based monomer (a) represented by the general formula (1) and the structural unit (II) derived from the unsaturated carboxylic acid-based monomer (b) represented by the general formula (2).

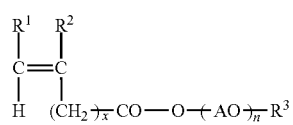

(1)

(2)

The structural unit (I) derived from the unsaturated polyalkylene glycol-based monomer (a) represented by the general formula (1) is specifically represented by the following formula.

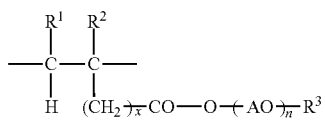

(I)

The structural unit (II) derived from the unsaturated carboxylic acid-based monomer (b) represented by the general formula (2) is specifically represented by the following formula.

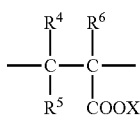

(II)

In each of the general formula (1) and the structural unit (I), $R^1$ and $R^2$ may be identical to or different from each other, and each represent a hydrogen atom or a methyl group.

In each of the general formula (1) and the structural unit (I), $R^3$ represents a hydrogen atom or a hydrocarbon group having 1 to 30 carbon atoms. Examples of the hydrocarbon group having 1 to 30 carbon atoms include an alkyl group having 1 to 30 carbon atoms (an aliphatic alkyl group or an alicyclic alkyl group), an alkenyl group having 1 to 30 carbon atoms, an alkynyl group having 1 to 30 carbon atoms, and an aromatic group having 6 to 30 carbon atoms. $R^3$ represents preferably a hydrogen atom or a hydrocarbon group having 1 to 20 carbon atoms, more preferably a hydrogen atom or a hydrocarbon group having 1 to 12 carbon atoms, still more preferably a hydrogen atom or a hydrocarbon group having 1 to 6 carbon atoms, particularly preferably a hydrogen atom or an alkyl group having 1 to 3 carbon atoms because the effects of the present invention can be further expressed.

In each of the general formula (1) and the structural unit (I), AO represents an oxyalkylene group having 2 to 18 carbon atoms, preferably an oxyalkylene group having 2 to 8 carbon atoms, more preferably an oxyalkylene group having 2 to 4 carbon atoms. In addition, when AO's represent any two or more kinds selected from, for example, an oxyethylene group, an oxypropylene group, an oxybutylene group, and an oxystyrene group, the addition form of AO's may be any one of the forms such as random addition, block addition, and alternate addition. In order to secure balance between hydrophilicity and hydrophobicity, an oxyethylene group is preferably incorporated as an essential component into oxyalkylene groups, an oxyethylene group more preferably accounts for 50 mol % or more of the entirety of the oxyalkylene groups, an oxyethylene group still more preferably accounts for 90 mol % or more of the entirety of the oxyalkylene groups, and an oxyethylene group particularly preferably accounts for 100 mol % or more of the entirety of the oxyalkylene groups.

In each of the general formula (1) and the structural unit (I), n represents the average number of moles added of oxyalkylene groups (sometimes referred to as "chain length") each represented by AO, and represents from 1 to 90, preferably from 2 to 70, more preferably from 3 to 60, still more preferably from 4 to 50, particularly preferably from 5 to 40, most preferably from 6 to 30. When n falls within the range, a cement additive that can express excellent retention when turned into a cement composition can be provided.

In each of the general formula (1) and the structural unit (I), x represents an integer of from 0 to 2.

Examples of the unsaturated polyalkylene glycol-based monomer (a) represented by the general formula (1) include: esterified products of alkoxy polyalkylene glycols obtained by adding alkylene oxides each having 2 to 8 carbon atoms to saturated aliphatic alcohols each having 1 to 20 carbon atoms, and (meth)acrylic acid or crotonic acid; esterified products of polyalkylene glycols obtained by polymerizing alkylene oxides each having 2 to 18 carbon atoms with saturated aliphatic alcohols each having 1 to 20 carbon atoms, and (meth)acrylic acid or crotonic acid; esterified products of alkoxy polyalkylene glycols obtained by adding alkylene oxides each having 2 to 8 carbon atoms to unsaturated aliphatic alcohols each having 3 to 20 carbon atoms, such as (meth)allyl alcohol, crotyl alcohol, and oleyl alcohol, and (meth)acrylic acid or crotonic acid; esterified products of polyalkylene glycols obtained by adding alkylene oxides each having 2 to 18 carbon atoms to unsaturated aliphatic alcohols each having 3 to 20 carbon atoms, such as (meth)allyl alcohol, crotyl alcohol, and oleyl alcohol, and (meth)acrylic acid or crotonic acid; esterified products of alkoxy polyalkylene glycols obtained by adding alkylene oxides each having 2 to 8 carbon atoms to alicyclic alcohols each having 3 to 20 carbon atoms, such as cyclohexanol, and (meth)acrylic acid or crotonic acid; esterified products of polyalkylene glycols obtained by adding alkylene oxides each having 2 to 18 carbon atoms to alicyclic alcohols each having 3 to 20 carbon atoms, such as cyclohexanol, and (meth)acrylic acid or crotonic acid; esterified products of alkoxy polyalkylene glycols obtained by adding alkylene oxides each having 2 to 8 carbon atoms to aromatic alcohols each having 6 to 20 carbon atoms, and (meth)acrylic acid or crotonic acid; and esterified products of polyalkylene glycols obtained by adding alkylene oxides each having 2 to 18 carbon atoms to aromatic alcohols each having 6 to 20 carbon atoms, and (meth)acrylic acid or crotonic acid.

The unsaturated polyalkylene glycol-based monomer (a) represented by the general formula (1) is preferably an ester of an alkoxy polyalkylene glycol of (meth)acrylic acid because the effects of present invention can be further expressed.

The unsaturated polyalkylene glycol-based monomers (a) each represented by the general formula (1) may be used alone or in combination thereof.

In each of the general formula (2) and the structural unit (II), $R^4$ to $R^6$ may be identical to or different from one another, and each represent a hydrogen atom, a methyl group, or a —$(CH_2)_z$COOM group, and the —$(CH_2)_z$COOM group may form an anhydride with a —COOX group or any other —$(CH_2)_z$COOM group, and z represents an integer of from 0 to 2.

M represents a hydrogen atom, a monovalent metal atom, a divalent metal atom, an ammonium group, or an organic ammonium group.

X represents a hydrogen atom, a monovalent metal atom, a divalent metal atom, an ammonium group, an organic ammonium group, or an organic amine group.

Examples of the unsaturated carboxylic acid-based monomer (b) represented by the general formula (2) include: monocarboxylic acid-based monomers, such as (meth) acrylic acid and crotonic acid, or salts thereof; dicarboxylic acid-based monomers, such as maleic acid, itaconic acid, and fumaric acid, or salts thereof; and anhydrides of dicarboxylic acid-based monomers, such as maleic acid, itaconic acid, and fumaric acid, or salts thereof. Examples of the "salt" as used herein include an alkali metal salt, an alkaline earth metal salt, an ammonium salt, an organic ammonium salt, and an organic amine salt. Examples of the alkali metal salt include a lithium salt, a sodium salt, and a potassium salt. Examples of the alkaline earth metal salt include a calcium salt and a magnesium salt. Examples of the organic ammonium salt include a methylammonium salt, an ethylammonium salt, a dimethylammonium salt, a diethylammonium salt, a trimethylammonium salt, and a triethylammonium salt. Examples of the organic amine salt include alkanolamine salts, such as an ethanolamine salt, a diethanolamine salt, a triethanolamine salt, and a triisopropanolamine salt.

The unsaturated carboxylic acid-based monomer (b) represented by the general formula (2) is preferably (meth) acrylic acid, maleic acid, or maleic anhydride, more preferably acrylic acid or methacrylic acid because the effects of the present invention can be further expressed.

The unsaturated carboxylic acid-based monomers (b) each represented by the general formula (2) may be used alone or in combination thereof.

The total content of the structural unit (I) and the structural unit (II) in the polycarboxylic acid-based copolymer (A) in the cement additive of the present invention is preferably from 50 wt % to 100 wt %, more preferably from 70 wt % to 100 wt %, still more preferably from 90 wt % to 100 wt %, particularly preferably from 95 wt % to 100 wt %, most preferably substantially 100 wt %. When the total content of the structural unit (I) and the structural unit (II) in the polycarboxylic acid-based copolymer (A) in the cement additive of the present invention falls within the range, a cement additive that can express excellent retention when turned into a cement composition can be provided.

The total content of the structural unit (I) and the structural unit (II) in the polycarboxylic acid-based copolymer (A) in the cement additive of the present invention may be known by, for example, various kinds of structural analysis (e.g., NMR) of the polycarboxylic acid-based copolymer (A). In addition, even when such various kinds of structural analysis as described above are not performed, the content of structural units derived from various monomers to be used at the time of the production of the polycarboxylic acid-based copolymer (A) in the cement additive of the present invention, the content being calculated on the basis of the usage amounts of the various monomers, may be adopted as the total content of the structural unit (I) and the structural unit (II) in the polycarboxylic acid-based copolymer (A) in the cement additive of the present invention. That is, the content of the total weight of the unsaturated polyalkylene glycol-based monomer (a) and the unsaturated carboxylic acid-based monomer (b) in all monomer components to be used at the time of the production of the polycarboxylic acid-based copolymer (A) in the cement additive of the present invention may be treated as the total content of the structural unit (I) and the structural unit (II) in the polycarboxylic acid-based copolymer (A) in the cement additive of the present invention.

The polycarboxylic acid-based copolymer (A) in the cement additive of the present invention may contain a structural unit (III) derived from any other monomer (c) in addition to the structural unit (I) and the structural unit (II).

The monomer (c) is a monomer copolymerizable with the monomer (a) and the monomer (b). The monomers (c) may be used alone or in combination thereof.

Examples of the monomer (c) include: hydroxyalkyl (meth)acrylates, such as hydroxyethyl (meth)acrylate and hydroxypropyl (meth)acrylate; esters of unsaturated monocarboxylic acids, such as methyl (meth)acrylate and glycidyl (meth)acrylate, and alcohols each having 1 to 30 carbon atoms; half esters of unsaturated dicarboxylic acids, such as maleic acid (anhydride), fumaric acid, and itaconic acid, and alcohols each having 1 to 30 carbon atoms; diesters of unsaturated dicarboxylic acids, such as maleic acid (anhydride), fumaric acid, and itaconic acid, and alcohols each having 1 to 30 carbon atoms; half amides of the unsaturated dicarboxylic acids and amines each having 1 to 30 carbon atoms; diamides of the unsaturated dicarboxylic acids and amines each having 1 to 30 carbon atoms; half esters of alkyl (poly)alkylene glycols obtained by adding 1 mol to 500 mol of alkylene oxides each having 2 to 18 carbon atoms to the alcohols or the amines, and the unsaturated dicarboxylic acids; diesters of alkyl (poly)alkylene glycols obtained by adding 1 mol to 500 mol of alkylene oxides each having 2 to 18 carbon atoms to the alcohols or the amines, and the unsaturated dicarboxylic acids; half esters of the unsaturated dicarboxylic acids and glycols each having 2 to 18 carbon atoms or polyalkylene glycols each having the number of moles added of the Glycols of from 2 to 500; diesters of the unsaturated dicarboxylic acids and glycols each having 2 to 18 carbon atoms or polyalkylene glycols having the number of moles added of the glycols of from 2 to 500; half amides of maleamic acid and glycols each having 2 to 18 carbon atoms or polyalkylene glycols having the number of moles added of the glycols of from to 500; (poly)alkylene glycol di(meth)acrylates, such as (poly)ethylene glycol di(meth) acrylate and (poly)propylene glycol di(meth)acrylate; polyfunctional (meth)acrylates, such as hexanediol di(meth) acrylate and trimethylolpropane tri(meth)acrylate; (poly) alkylene glycol dimaleates, such as polyethylene glycol dimaleate; unsaturated sulfonic acids (sulfonates), such as vinyl sulfonate, (meth)allyl sulfonate, 2-methylpropanesulfonic acid (meth)acrylamide, and styrenesulfonic acid; amides of unsaturated monocarboxylic acids, such as methyl (meth)acrylamide, and amines each having 1 to 30 carbon atoms; vinyl aromatic compounds, such as styrene, α-methylstyrene, and vinyltoluene; alkanediol mono(meth)acrylates, such as 1,4-butanediol mono(meth)acrylate; dienes, such as butadiene and isoprene; unsaturated amides, such as (meth)acrylic (alkyl)amide, N-methylol (meth)acrylamide, and N,N-dimethyl (meth)acrylamide; unsaturated cyanogen compounds, such as (meth)acrylonitrile; unsaturated esters, such as vinyl acetate; unsaturated amines, such as aminoethyl (meth)acrylate, dimethylaminoethyl (meth)acrylate, and vinylpyridine; divinyl aromatic compounds, such as divinylbenzene; allyl compounds, such as (meth)allyl alcohol and glycidyl (meth)allyl ether; vinyl ethers, such as (methoxy) polyethylene glycol monovinyl ether; and (meth) allyl ethers, such as (methoxy) polyethylene glycol mono (meth)allyl ether.

The content of the structural unit (III) in the polycarboxylic acid-based copolymer (A) in the cement additive of the present invention may be known by, for example, various kinds of structural analysis (e.g., NMR) of the polycarboxylic acid-based copolymer (A). In addition, even when such various kinds of structural analysis as described above are not performed, the content of structural units derived from various monomers to be used at the time of the production of the polycarboxylic acid-based copolymer (A) in the cement additive of the present invention, the content being calculated on the basis of the usage amounts of the various monomers, may be adopted as the content of the structural unit (III) in the polycarboxylic acid-based copolymer (A) in the cement additive of the present invention. That is, the content of the weight of the other monomer (c) in all the monomer components to be used at the time of the production of the polycarboxylic acid-based copolymer (A) in the cement additive of the present invention may be treated as the content of the structural unit (III) in the polycarboxylic acid-based copolymer (A) in the cement additive of the present invention.

The content of the structural unit (II) (hereinafter sometimes referred to as "acid content") with respect to the total amount of the structural unit (I) and the structural unit (II) in the polycarboxylic acid-based copolymer (A) in the cement additive of the present invention is 60 mol % or less. The content is, as a lower limit value, preferably 1.0 mol % or more, more preferably 2.0 mol % or more, still more preferably 3.0 mol % or more, even still more preferably 4.0 mol % or more, even yet still more preferably 5.0 mol % or more, particularly preferably 7.0 mol % or more, most preferably 10 mol % or more, and is, as an upper limit value, preferably 57 mol % or less, more preferably 55 mol % or less, still more preferably 52 mol % or less, even still more preferably 50 mol % or less, even yet still more preferably 45 mol % or less, even yet still more preferably 40 mol % or less, particularly preferably 30 mol % or less, most preferably 25 mol % or less. When the content of the structural unit (II) with respect to the total amount of the structural unit (I) and the structural unit (II) in the polycarboxylic acid-based copolymer (A) in the cement additive of the present invention falls within the range, the cement additive of the present invention can suppress the production of Glauber's salt as a by-product, and can express excellent retention when turned into a cement composition.

In the case of the calculation of the content of a structural unit in the polycarboxylic acid-based copolymer (A) in the cement additive of the present invention, when the structural unit has a carboxyl group, the calculation is performed on the assumption that the group is completely neutralized.

The weight-average molecular weight (Mw) of the polycarboxylic acid-based copolymer (A) in the cement additive of the present invention is preferably 10,000 or more, more preferably from 20,000 to 1,000,000, still more preferably from 30,000 to 1,000,000, even still more preferably from 40,000 to 900,000, even yet still more preferably from 50,000 to 500,000, particularly preferably from 80,000 to 400,000, most preferably from 100,000 to 300,000. When the weight-average molecular weight (Mw) of the polycarboxylic acid-based copolymer (A) in the cement additive of the present invention falls within the range, a cement additive that can express excellent retention when turned into a cement composition can be provided.

The polycarboxylic acid-based copolymer (A) in the cement additive of the present invention may be produced by any appropriate method to the extent that the effects of the present invention are not impaired. The polycarboxylic acid-based copolymer (A) in the cement additive of the present invention may be preferably produced by performing the polymerization of the monomer components including the unsaturated polyalkylene glycol-based monomer (a) and the unsaturated carboxylic acid-based monomer (b) in the presence of a polymerization initiator.

The usage amounts of the unsaturated polyalkylene glycol-based monomer (a), the unsaturated carboxylic acid-based monomer (b), and as required, the other monomer (c) that may be used in the production of the polycarboxylic acid-based copolymer (A) in the cement additive of the present invention only need to be appropriately adjusted so that the ratio of the structural unit derived from each monomer in all structural units forming the polycarboxylic acid-based copolymer (A) in the cement additive of the present invention may be that described in the foregoing. Each monomer is preferably used at the same ratio as the ratio of the structural unit derived from the monomer in all the structural units forming the polycarboxylic acid-based copolymer (A) in the cement additive of the present invention described in the foregoing on the assumption that the polymerization reaction quantitatively advances.

The polymerization of the monomer components may be performed by any appropriate method. Examples thereof include solution polymerization and bulk polymerization. Examples of the system of the solution polymerization include a batch system and a continuous system. Examples of a solvent that may be used in the solution polymerization include: water; alcohols, such as methyl alcohol, ethyl alcohol, and isopropyl alcohol; aromatic or aliphatic hydrocarbons, such as benzene, toluene, xylene, cyclohexane, and n-hexane; ester compounds, such as ethyl acetate; ketone compounds, such as acetone and methyl ethyl ketone; and cyclic ether compounds, such as tetrahydrofuran and dioxane.

When the polymerization of the monomer components is performed, for example, water-soluble polymerization initiators, including: persulfates, such as ammonium persulfate, sodium persulfate, and potassium persulfate; hydrogen peroxide; and water-soluble azo-based initiators, for example, azoamidine compounds, such as 2,2'-azobis-2-methylpropionamidine hydrochloride, cyclic azoamidine compounds, such as 2,2'-azobis-2-(2-imidazolin-2-yl)propane hydrochloride, and azonitrile compounds, such as 2-carbamoylazoisobutyronitrile, may each be used as the polymerization initiator. Those polymerization initiators may each be used in combination with an accelerator, such as an alkali metal sulfite, such as sodium hydrogen sulfite, a metabisulfite, sodium hypophosphite, an Fe(II) salt, such as Mohr's salt, sodium hydroxymethanesulfinate dihydrate, hydroxylamine hydrochloride, thiourea, L-ascorbic acid (salt), or erythorbic acid (salt). Of those combined use forms, the combination of hydrogen peroxide and an accelerator, such as L-ascorbic acid (salt), is preferred. Those polymerization initiators or accelerators may be used alone or in combination thereof.

When the solution polymerization is performed by using a lower alcohol, an aromatic hydrocarbon, an aliphatic hydrocarbon, an ester compound, or a ketone compound as the solvent, or when the bulk polymerization is performed, for example, peroxides, such as benzoyl peroxide, lauroyl peroxide, and sodium peroxide, hydroperoxides, such as t-butyl hydroperoxide and cumene hydroperoxide, and azo compounds, such as azobisisobutyronitrile, may each be used as the polymerization initiator. When any such polymerization initiator is used, an accelerator, such as an amine compound, may be used in combination therewith. Further, when a mixed solvent containing water and a lower alcohol is used, a polymerization initiator appropriately selected from the various polymerization initiators, or a combination appropriately selected from the combinations of the polymerization initiators and the accelerators may be used.

A reaction temperature at the time of the polymerization of the monomer components is appropriately determined by a polymerization method, a solvent, a polymerization initiator, and a chain transfer agent to be used. Such reaction temperature is preferably 0° C. or more, more preferably 30° C. or more, still more preferably 50° C. or more, and is preferably 150° C. or less, more preferably 120° C. or less, still more preferably 100° C. or less.

Any appropriate method may be adopted as a method of loading the monomer components into a reaction vessel. Examples of such loading method include: a method involving collectively loading the total amount of the components into the reaction vessel at an initial stage; a method involving loading the total amount into the reaction vessel in a divided or continuous manner; and a method involving loading part of the components into the reaction vessel at the initial stage and loading the remainder thereof into the reaction vessel in a divided or continuous manner. Specific examples thereof include: a method involving continuously loading the total amount of the monomer (a) and the total amount of the monomer (b) into the reaction vessel; a method involving loading part of the monomer (a) into the reaction vessel at the initial stage, and continuously loading the remainder of the monomer (a) and the total amount of the monomer (b) into the reaction vessel; and a method involving loading part of the monomer (a) and part of the monomer (b) into the reaction vessel at the initial stage, and alternately loading the remainder of the monomer (a) and the remainder of the monomer (b) into the reaction vessel several times each in a divided manner. Further, two or more kinds of copolymers different from each other in ratio between the structural unit (I) and the structural unit (II) may be simultaneously synthesized during the polymerization reaction by changing the rate at which each monomer is loaded into the reaction vessel in a continuous or stepwise manner in the midst of the reaction to change the loading weight ratio of each monomer per unit time in a continuous or stepwise manner. A polymerization initiator may be loaded into the reaction vessel from the beginning, or may be dropped into the reaction vessel, or these methods may be combined in accordance with purposes.

A chain transfer agent may be preferably used at the time of the polymerization of the monomer components. The use of the chain transfer agent facilitates the adjustment of the molecular weight of the copolymer to be obtained. The chain transfer agents may be used alone or in combination thereof.

Any appropriate chain transfer agent may be adopted as the chain transfer agent. Examples of such chain transfer agent include: thiol-based chain transfer agents, such as mercaptoethanol, thioglycerol, thioglycolic acid, 2-mercaptopropionic acid, 3-mercaptopropionic acid, thiomalic acid, and 2-mercaptoethanesulfonic acid; secondary alcohols, such as isopropanol; and lower oxides of phosphorous acid, hypophosphorous acid, and salts thereof (e.g., sodium hypophosphite and potassium hypophosphite), and sulfurous acid, hydrogen sulfite, dithionous acid, metabisulfurous acid, and salts thereof (e.g., sodium sulfite, potassium sulfite, sodium hydrogen sulfite, potassium hydrogen sulfite, sodium dithionite, potassium dithionite, sodium metabisulfite, and potassium metabisulfite), and salts thereof.

Although the produced polycarboxylic acid-based copolymer (A) may be used as it is or as the polycarboxylic acid-based copolymer (A) in the cement additive of the present invention, the pH of a reaction solution after the production of the polycarboxylic acid-based copolymer (A) is preferably adjusted to 5 or more from the viewpoint of its handleability. However, in order that a rate of polymerization may be improved, it is preferred that the polymerization be performed at a pH of less than 5 and the pH be adjusted to 5 or more after the polymerization. The adjustment of the pH may be performed with, for example, an alkaline substance, such as: an inorganic salt, such as a hydroxide or carbonate of a monovalent metal or a divalent metal; ammonia; or an organic amine.

The concentration of the solution obtained by the production of the polycarboxylic acid-based copolymer (A) may be adjusted as required.

The produced polycarboxylic acid-based copolymer (A) may be used as it is in the form of the solution, or may be used after having been powdered by the following: the copolymer is neutralized with a hydroxide of a divalent metal, such as calcium or magnesium, to be turned into a polyvalent metal salt, and is then dried; or the copolymer is carried on inorganic powder, such as silica-based fine powder, and dried.

<Alkanolamine Compound (B)>

Any appropriate alkanolamine compound may be adopted as the alkanolamine compound (B) to the extent that the effects of the present invention are not impaired. Examples of such alkanolamine compound include a low molecular-type alkanolamine compound and a polymer-type alkanolamine compound.

Examples of the low molecular-type alkanolamine compound include monoethanolamine, diethanolamine, triethanolamine, monoisopropanolamine, diisopropanolamine, triisopropanolamine, methylethanolamine, methylisopropanolamine, methyldiethanolamine, methyldiisopropanolamine, diethanolisopropanolamine, diisopropanolethanolamine, tetrahydroxyethylethylenediamine, N,N-bis(2-hydroxyethyl)2-propanolamine, N,N-bis(2-hydroxypropyl)-N-(hydroxyethyl)amine, N,N-bis(2-hydroxyethyl)-N-(2-hydroxypropyl)amine, N,N,N',N'-tetra (2-hydroxypropyl)ethylenediamine, N,N,N',N'',N''-pentakis (2-hydroxypropyl)diethylenetriamine, and tris(2-hydroxybutyl)amine. Of those, the low molecular-type alkanolamine compound is preferably triisopropanolamine, diethanolisopropanolamine, or diisopropanolethanolamine, more preferably diethanolamine, triethanolamine, or triisopropanolamine. Other examples of the low molecular-type alkanolamine compound include monomers having skeletons of diethanolamine, triethanolamine, and triisopropanolamine.

An example of the polymer-type alkanolamine compound is an alkanolamine having a structure in which part of an alkanolamine is bonded to a polymer. An example of such polymer-type alkanolamine compound is a polymer having a skeleton of triisopropanolamine.

<<Cement Composition>>

A cement composition of the present invention includes the cement additive of the present invention.

In addition to the cement additive of the present invention, the cement composition of the present invention preferably includes cement, water, and an aggregate, and more preferably includes the cement, water, the aggregate, and a cement admixture.

The content of the cement additive of the present invention in the cement composition of the present invention is, with respect to the cement composition, in terms of solid content, preferably from 0.001 wt % to 1 wt %, more preferably from 0.005 wt % to 0.9 wt %, still more preferably from 0.01 wt % to 0.8 wt %, particularly preferably from 0.01 wt % to 0.7 wt %, most preferably from 0.01 wt % to 0.5 wt %. When the content of the cement additive of the present invention in the cement composition of the present invention falls within the range with respect to the cement composition, the cement additive can express excellent retention when turned into a cement composition.

Any appropriate aggregate, such as a fine aggregate (e.g., sand) or a coarse aggregate (e.g., a crushed stone), may be adopted as the aggregate. Examples of such aggregate include gravel, a crushed stone, a water-granulated slag, and a recycled aggregate. Further examples of such aggregate include silica stone, clay, zircon, high alumina, silicon carbide, graphite, chromium, chrome magnesite, and magnesia refractory aggregates.

The cement admixture preferably contains a polymer for a cement admixture because the effects of the present invention can be more effectively expressed.

An example of the polymer for a cement admixture is a cement dispersant. The cement dispersants may be used alone or in combination thereof.

Examples of the cement dispersant include a sulfonic acid-based dispersant having a sulfonic acid group in a molecule thereof, and a polycarboxylic acid-based dispersant except the polycarboxylic acid-based copolymer (A) in the cement additive of the present invention.

Examples of the sulfonic acid-based dispersant include: polyalkylarylsulfonic acid salt-type sulfonic acid-based dispersants, such as a naphthalenesulfonic acid formaldehyde condensate, a methylnaphthalenesulfonic acid formaldehyde condensate, and an anthracenesulfonic acid formaldehyde condensate; melamine formalin resin sulfonic acid salt-type sulfonic acid-based dispersants, such as a melaminesulfonic acid formaldehyde condensate; aromatic aminosulfonic acid salt-type sulfonic acid-based dispersants, such as an aminoarylsulfonic acid-phenol-formaldehyde condensate; ligninsulfonic acid salt-type sulfonic acid-based dispersants, such as a ligninsulfonic acid salt and a modified ligninsulfonic acid salt; and polystyrenesulfonic acid salt-type sulfonic acid-based dispersants.

The cement admixture may contain any appropriate other cement additive (material) to the extent that the effects of the present invention are not impaired. Examples of such other cement additive (material) include such other cement additives (materials) as listed in the following (1) to (12). Any appropriate blending ratio may be adopted as a blending ratio between the polymer for a cement admixture and such other cement additive (material) that may be incorporated into the cement admixture in accordance with the kind and purpose of the other cement additive (material) to be used.

(1) Water-soluble polymer substance: nonionic cellulose ethers, such as methyl cellulose, ethyl cellulose, and carboxymethyl cellulose; polysaccharides produced through microorganism fermentation, such as yeast glucan, xanthan gum, and β-1,3 glucan; polyoxyalkylene glycols, such as polyethylene glycol; polyacrylamide; and the like.

(2) Polymer emulsion: copolymers of various vinyl monomers, such as an alkyl (meth)acrylate, and the like.

(3) Hardening retarder: oxycarboxylic acids, such as gluconic acid, glucoheptonic acid, arabonic acid, malic acid, and citric acid, or salts thereof; sugars and sugar alcohols; polyhydric alcohols, such as glycerin; phosphoric acids, such as aminotri(methylenephosphonic acid), and derivatives thereof; and the like.

The ratio of the hardening retarder to the polycarboxylic acid-based copolymer (A) is preferably from 1 wt % to 10,000 wt %, more preferably from 2 wt % to 1,000 wt %, still more preferably from 5 wt % to 500 wt %, particularly preferably from 8 wt % to 100 wt %, most preferably from 10 wt % to 50 wt %.

(4) High early strength agent and accelerator: soluble calcium salts, such as calcium chloride, calcium nitrite, calcium nitrate, calcium bromide, and calcium iodide; chlorides, such as iron chloride and magnesium chloride; sulfuric acid salts; potassium hydroxide; sodium hydroxide; carbonic acid salts; thiosulfuric acid salts; formic acid and formic acid salts, such as calcium formate; alkanolamines; alumina cement; calcium aluminate silicate; and the like.

(5) Oxyalkylene-based defoaming agent: polyoxyalkylenes, such as a (poly)oxyethylene (poly)oxypropylene adduct; polyoxyalkylene alkyl ethers, such as diethylene glycol heptyl ether; polyoxyalkylene acetylene ethers; (poly)oxyalkylene fatty acid esters; polyoxyalkylene sorbitan fatty acid esters; polyoxyalkylene alkyl (aryl) ether sulfuric acid ester salts; polyoxyalkylene alkyl phosphoric acid esters; polyoxyalkylene alkylamines, such as polyoxypropylene polyoxyethylene laurylamine (e.g., propylene oxide 1 mole to 20 mole adduct and ethylene oxide 1 mole to 20 mole adduct) and an amine derived from a fatty acid obtained from hardened beef tallow having an alkylene oxide added thereto (e.g., propylene oxide 1 mole to 20 mole adduct or ethylene oxide 1 mole to 20 mole adduct); polyoxyalkylene amides; and the like.

(6) Defoaming agent except oxyalkylene-based defoaming agent: mineral oil-based, oil and fat-based, fatty acid-based, fatty acid ester-based, alcohol-based, amide-based, phosphoric acid ester-based, metal soap-based, and silicone-based defoaming agents.

(7) AE agent: a resin soap, a saturated or unsaturated fatty acid, sodium hydroxystearate, lauryl sulfate, an alkylbenzene sulfonic acid (ABS), an alkane sulfonate, a polyoxyethylene alkyl (phenyl) ether, a polyoxyethylene alkyl (phenyl) ether sulfuric acid ester or salts thereof, a polyoxyethylene alkyl (phenyl) ether phosphoric acid ester or salts thereof, a protein material, an alkenyl sulfosuccinic acid, an α-olefin sulfonate, and the like.

(8) Other surfactant: various anionic surfactants; various cationic surfactants, such as an alkyltrimethylammonium chloride; various nonionic surfactants; various ampholytic surfactants; and the like.

(9) Waterproof agent: a fatty acid (salt), a fatty acid ester, an oil and fat, silicon, paraffin, asphalt, a wax, and the like.

(10) Antirust agent: a nitrous acid salt, a phosphoric acid salt, zinc oxide, and the like.

(11) Crack reducing agent: a polyoxyalkyl ether and the like.

(12) Expansion material: ettringite-based and coal-based expansion materials and the like.

Examples of the other known cement additives (materials) may include a cement moisturizer, a thickener, a separation reducing agent, a flocculant, a dry shrinkage reducing agent, a strength improving agent, a self-leveling agent, an antirust agent, a colorant, and a fungicide. Those known cement additives (materials) may be used alone or in combination thereof.

Any appropriate cement may be adopted as the cement in the cement composition of the present invention. Examples of such cement include portland cements (ordinary, high early strength, ultrahigh early strength, moderate heat, and sulfate resistant portland cements, and low alkali forms thereof), various mixed cements (blast furnace cement, silica cement, and fly ash cement), white portland cement, alumina cement, ultrarapid hardening cements (one-clinker rapid hardening cement, two-clinker rapid hardening cement, and magnesium phosphate cement), cement for grout, oil well cement, low-heat-generating cements (low-heat-generation-type blast furnace cement, fly ash-mixed low-heat-generation-type blast furnace cement, and belite-rich cement), ultrahigh strength cement, cement-based solidification materials, and eco-cements (cement manufactured from one or more kinds of municipal solid waste incineration ash and sewage sludge incineration ash as raw materials). Further, fine powder, such as blast furnace slag, fly ash, cinder ash, clinker ash, husk ash, silica powder, or limestone powder, or plaster may be added to the cement composition of the present invention. The cements in the cement composition of the present invention may be used alone or in combination thereof.

In the cement composition of the present invention, a unit amount of water per 1 $m^3$ thereof, a cement usage amount per 1 $m^3$ thereof, and a water/cement ratio may be set to any appropriate values. Such values are as follows: it is preferred that the unit amount of water be from 100 $kg/m^3$ to 185 $kg/m^3$, the cement usage amount be from 250 $kg/m^3$ to 800 $kg/m^3$, and the water/cement ratio (weight ratio) be from 0.1 to 0.7; and it is more preferred that the unit amount of water be from 120 $kg/m^3$ to 175 $kg/m^3$, the cement usage amount be from 270 $kg/m^3$ to 800 $kg/m^3$, and the water/cement ratio (weight ratio) be from 0.12 to 0.65. Thus, the cement composition of the present invention can be used in a wide variety of concrete ranging from poor-mix concrete to rich-mix concrete, and is effective for each of high-strength concrete having a large unit cement content and poor-mix concrete having a unit cement content of 300 $kg/m^3$ or less.

When the cement composition of the present invention includes the polymer for a cement admixture, any appropriate content may be adopted as the content of the polymer for a cement admixture in the cement composition of the present invention in accordance with purposes. With regard to such content, when the polymer is used in, for example, mortar or concrete using hydraulic cement, the content of the polymer for a cement admixture with respect to 100 parts by weight of the cement composition is preferably from 0.01 part by weight to 10 parts by weight, more preferably from 0.02 part by weight to 5 parts by weight, still more preferably from 0.05 part by weight to 3 parts by weight. When such content is adopted, various preferred effects, such as a reduction in unit amount of water of the cement composition, the enhancement of the strength thereof, and an improvement in durability thereof, are obtained. When the content is less than 0.01 part by weight, the polymer may be unable to express sufficient performance. When the content is more than 10 parts by weight, an effect that can be expressed by the polymer may substantially hit its ceiling to cause a disadvantage in terms of economical efficiency.

Any appropriate content may be adopted as the content of the cement admixture in the cement composition of the present invention in accordance with purposes. With regard to such content, the content of the cement admixture with respect to 100 parts by weight of the cement composition is preferably from 0.01 part by weight to 10 parts by weight, more preferably from 0.05 part by weight to 8 parts by weight, still more preferably from 0.1 part by weight to 5 parts by weight. When the content is less than 0.01 part by weight, the cement admixture may be unable to express sufficient performance. When the content is more than 10 parts by weight, an effect that can be expressed by the cement admixture may substantially hit its ceiling to cause a disadvantage in terms of economical efficiency.

The cement composition of the present invention can be effective for ready-mixed concrete, concrete for a concrete secondary product, concrete for centrifugal molding, concrete for vibrating compaction, steam-cured concrete, spray concrete, and the like. The cement composition of the present invention can also be effective for mortar or concrete requiring high fluidity, such as medium fluidity concrete (concrete having a slump value of from 22 cm to 25 cm), high fluidity concrete (concrete having a slump value of 25 cm or more and a slump flow value of from 50 cm to 70 cm), self-compacting concrete, or a self-leveling material.

The cement composition of the present invention only needs to be prepared through the blending of its constituent components by any appropriate method. For example, a method involving mixing the constituent components in a mixer is available.

<<Raw Material for Cement Additive>>

A raw material for a cement additive of the present invention is used in the cement additive of the present invention.

One raw material for a cement additive of the present invention is the polycarboxylic acid-based copolymer (A). That is, a compound that is the polycarboxylic acid-based copolymer (A) and is used in the cement additive of the present invention is the raw material for a cement additive of the present invention.

Another raw material for a cement additive of the present invention is the alkanolamine compound (B). That is, a compound that is the alkanolamine compound (B) and is used in the cement additive of the present invention is the raw material for a cement additive of the present invention.

EXAMPLES

The present invention is described in more detail below by way of Examples, but the present invention is not limited to these Examples. "Part(s)" means "part(s) by weight" and "%" means "wt %" unless otherwise specified.

<Conditions for Analysis of Weight-Average Molecular Weight>

A weight-average molecular weight was measured under the following conditions.

Apparatus: Waters Alliance (2695)
Analysis software: manufactured by Waters, Empower Professional+GPC option
Used column: manufactured by Tosoh Corporation, TSK Guard Columns SWXL+TSKgel G4000SWXL+G3000SWXL+G2000SWXL
Detector: refractive index (RI) detector (Waters 2414) and photodiode array (PDA) detector (Waters 2996)
Eluent: solution obtained by dissolving 115.6 g of sodium acetate trihydrate into a mixed solvent of 10,999 g of water and 6,001 g of acetonitrile, and further adjusting the pH to 6.0 with acetic acid Standard substance for drawing calibration curve: polyethylene glycol (peak top molecular weight (Mp): 272,500, 219,300, 107,000, 50,000, 24,000, 12,600, 7,100, 4,250, and 1,470)

Calibration curve: drawn in a cubic expression on the basis of the Mp values and elution times of the polyethylene glycols Flow rate: 1 mL/min Column temperature: 40° C.

Measurement time: 45 min

Sample concentration: 0.5 wt %

Sample solution injection volume: 100 µL

<<Mortar Test>>

A mortar test was performed by using a cement additive obtained in each of Examples and Comparative Examples.

Specifically, a mixer for mechanical mixing, a spoon, a flow table, a flow cone, and a push rod in conformity with JIS-R5201-1997 were used. At this time, the mortar test was performed in conformity with JIS-R5201-1997 unless otherwise stated.

Materials used in the test and the formulation of mortar are as follows: 587 g of ordinary portland cement manufactured by Taiheiyo Cement Corporation, 1,350 g of land sand produced in the Oi River system, and 264 g of ion-exchanged water containing an aqueous solution of a polymer for a cement admixture and a defoaming agent. The defoaming agent was added for the purpose of avoiding the influences of air bubbles on the strength of a mortar composition, and was added so that the air amount of the mortar became 3.0% or less. When the air amount of the mortar was more than 3.0%, the addition amount of the defoaming agent was regulated so that the air amount became 3.0% or less.

The mortar was prepared at room temperature (20±2° C.) with a Hobart-type mortar mixer (model number: N-50, manufactured by Hobart) over 4 minutes and 30 seconds. Specifically, a specified amount of the cement was loaded into a mixing bowl, and the mixing bowl was attached to the mixer, followed by the starting of the mixer at a low speed. 15 Seconds after the starting of a paddle, a specified amount of the water containing the polymer for a cement admixture and the defoaming agent was loaded into the mixing bowl over 15 seconds. After that, the sand was loaded into the mixing bowl, and the mixture was mixed at the low speed for 30 seconds. After that, the speed was changed to a high speed and the mixing was continued for 30 seconds. The mixing bowl was removed from the mixer and the mixing was stopped for 120 seconds. After that, the mixing bowl was attached to the mixer again. After the mixture had been mixed at the high speed for 60 seconds (4 minutes and 30 seconds after the very first starting at the low speed), the mixture was left at rest for a predetermined time period, and was then stirred with the spoon in left and right directions 10 times each. The mixed mortar was packed in two layers in the flow cone arranged on the flow table. The entire surface of each layer was pushed with the push rod 15 times so that the tip of the push rod entered as far as about one half of the depth of the layer. Finally, a shortage was covered and a surface was leveled. 6 Minutes after the very first starting at the low speed, the flow cone was vertically lifted and removed, and was subjected to a falling motion 15 times over 15 seconds. The diameter of the mortar that had spread over the table was measured in two directions, and the average of the measured values was defined as a flow value.

A retention rate is a value calculated from the expression "[flow value (mm) predetermined time period after spreading/flow value (mm) 5 minutes after spreading]×100."

The results are shown in Table 2.

<<Glauber's Salt Test>>

An aqueous solution of the cement additive obtained in each of Examples and Comparative Examples was produced so that the concentration of a solid content in the solution was adjusted to 40 wt %. The amount of Glauber's salt to be produced as a by-product was observed under the condition of 2° C. The amount of Glauber's salt to be produced as a by-product was evaluated in accordance with the following criteria.

⊚: The production of Glauber's salt as a by-product was not observed.

○: The production of Glauber's salt as a by-product was slightly observed.

Δ: The production of Glauber's salt as a by-product was observed.

x: The production of Glauber's salt as a by-product was remarkably observed.

[Production Example 1]: Production of Water-Reducing Agent 80.0 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 133.4 parts of methoxy polyethylene glycol monomethacrylic acid ester (average number of moles added of ethylene oxide: 9), 26.6 parts of methacrylic acid, 1.53 parts of mercaptopropionic acid, and 106.7 parts of ion-exchanged water was dropped into the vessel over 4 hours. Simultaneously with the dropping, a mixed solution of 1.19 parts of ammonium persulfate and 50.6 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide. Thus, an aqueous solution of a copolymer (1) having a weight-average molecular weight of 20,000 was obtained.

Production Example 2

50.00 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 95.98 parts of methoxy polyethylene glycol monomethacrylic acid ester (average number of moles added of ethylene oxide: 9), 4.02 parts of methacrylic acid, 0.15 part of mercaptopropionic acid, and 42.86 parts of ion-exchanged water was dropped into the vessel over 4 hours. Simultaneously with the dropping, a mixed solution of 1.00 part of ammonium persulfate and 56.6 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7. Thus, an aqueous solution of a copolymer (2)

having a weight-average molecular weight of 85,800 was obtained. Details about the copolymer (2) are shown in Table 1.

Production Example 3

60.00 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 115.17 parts of methoxy polyethylene glycol monomethacrylic acid ester (average number of moles added of ethylene oxide: 45), 4.83 parts of methacrylic acid, 0.12 part of mercaptopropionic acid, and 98.21 parts of ion-exchanged water was dropped into the vessel over 4 hours. Simultaneously with the dropping, a mixed solution of 1.2 parts of ammonium persulfate and 21.5 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7. Thus, an aqueous solution of a copolymer (3) having a weight-average molecular weight of 102,600 was obtained. Details about the copolymer (3) are shown in Table 1.

Production Example 4

181.95 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 191.87 parts of methoxy polyethylene glycol monomethacrylic acid ester (average number of moles added of ethylene oxide: 25), 8.04 parts of methacrylic acid, 1.24 parts of mercaptopropionic acid, and 10.3 parts of ion-exchanged water was dropped into the vessel over 4 hours. Simultaneously with the dropping, a mixed solution of 2.00 parts of ammonium persulfate and 49.6 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7. Thus, an aqueous solution of a copolymer (4) having a weight-average molecular weight of 27,000 was obtained. Details about the copolymer (4) are shown in Table 1.

Production Example 5

181.95 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 183.64 parts of methoxy polyethylene glycol monomethacrylic acid ester (average number of moles added of ethylene oxide: 25), 16.26 parts of methacrylic acid, 1.02 parts of mercaptopropionic acid, and 14.91 parts of ion-exchanged water was dropped into the vessel over 4 hours. Simultaneously with the dropping, a mixed solution of 2.00 parts of ammonium persulfate and 49.55 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7.0. Thus, an aqueous solution of a copolymer (5) having a weight-average molecular weight of 40,600 was obtained. Details about the copolymer (5) are shown in Table 1.

Production Example 6

50.00 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 99.80 parts of methoxy polyethylene Glycol monomethacrylic acid ester (average number of moles added of ethylene oxide: 9), 0.2 part of methacrylic acid, 0.17 part of mercaptopropionic acid, and 43.14 parts of ion-exchanged water was dropped into the vessel over 4 hours. Simultaneously with the dropping, a mixed solution of 1.00 part of ammonium persulfate and 56.54 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7.0. Thus, an aqueous solution of a copolymer (6) having a weight-average molecular weight of 68,900 was obtained. Details about the copolymer (6) are shown in Table 1.

Production Example 7

50.00 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 94.54 parts of methoxy polyethylene glycol monomethacrylic acid ester (average number of moles added of ethylene oxide: 9), 5.46 parts of methacrylic acid, 0.38 part of mercaptopropionic acid, and 42.86 parts of ion-exchanged water was dropped into the vessel over 4 hours. Simultaneously with the dropping, a mixed solution of 1.00 part of ammonium persulfate and 55.77 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7.0. Thus, an aqueous solution of a copolymer (7) having a weight-average molecular weight of 22,000 was obtained. Details about the copolymer (7) are shown in Table 1.

Production Example 8

50.00 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 97.93 parts of methoxy polyethylene glycol monomethacrylic acid ester (average number of moles added of ethylene oxide: 90), 2.07 parts of methacrylic acid, 0.05 part of mercaptopropionic acid, and 42.86 parts of ion-exchanged water was dropped into the vessel over 4 hours. Simultaneously with the dropping, a mixed solution of 1.00 part of ammonium persulfate and 56.09 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7.0. Thus, an aqueous solution of a copolymer (8) having a weight-average molecular weight of 56,000 was obtained. Details about the copolymer (8) are shown in Table 1.

Production Example 9

50.00 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 100.00 parts of methoxy polyethylene glycol monomethacrylic acid ester (average number of moles added of ethylene oxide: 9), 0.13 part of mercaptopropionic acid, and 42.86 parts of ion-exchanged water was dropped into the vessel over 4 hours. Simultaneously with the dropping, a mixed solution of 1.00 part of ammonium persulfate and 56.10 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7.0. Thus, an aqueous solution of a copolymer (9) having a weight-average molecular weight of 140,000 was obtained. Details about the copolymer (9) are shown in Table 1.

Production Example 10

100.00 Parts of ion-exchanged water was loaded into a reaction vessel made of glass including a Dimroth condenser, a stirrer with a stirring blade and a stirring seal made of Teflon™, a nitrogen-introducing tube, and a temperature sensor, and was warmed to 70° C. under stirring at 250 rpm while nitrogen was introduced at 200 mL/min. Next, a mixed solution of 178.73 parts of methoxy polyethylene glycol monomethacrylic acid ester (average number of moles added of ethylene oxide: 25), 21.27 parts of methacrylic acid, 1.05 parts of mercaptopropionic acid, and 85.71 parts of ion-exchanged water was dropped into the vessel over 4 hours. Simultaneously with the dropping, a mixed solution of 2.00 parts of ammonium persulfate and 112.42 parts of ion-exchanged water was dropped into the vessel over 5 hours. After the completion of the dropping, the temperature in the vessel was kept at 70° C. for 1 hour to complete a polymerization reaction. Then, the resultant was neutralized with an aqueous solution of sodium hydroxide so as to have a pH of 7.0. Thus, an aqueous solution of a copolymer (10) having a weight-average molecular weight of 21,600 was obtained. Details about the copolymer (10) are shown in Table 1.

TABLE 1

|  | Acid amount (mol %) | Chain length n | Weight-average molecular weight Mw |
|---|---|---|---|
| Copolymer (2) | 19.5 | 9 | 85,800 |
| Copolymer (3) | 50.4 | 45 | 102,600 |
| Copolymer (4) | 36.9 | 25 | 27,000 |
| Copolymer (5) | 55.3 | 25 | 40,600 |
| Copolymer (6) | 1.15 | 9 | 68,900 |
| Copolymer (7) | 25 | 9 | 22,000 |
| Copolymer (8) | 50 | 90 | 56,000 |
| Copolymer (9) | 0 | 9 | 140,000 |
| Copolymer (10) | 62.4 | 25 | 21,600 |

Example 1

The copolymer (2) and triethanolamine (manufactured by Wako Pure Chemical industries, Ltd., sometimes abbreviated as "TEA") were blended under a condition shown in Table 2 to prepare a cement additive (1).

The result is shown in Table 2.

Example 2

The copolymer (2) and TEA were blended under a condition shown in Table 2 to prepare a cement additive (2).

The result is shown in Table 2.

Example 3

The copolymer (2) and triisopropanolamine (manufactured by Wako Pure Chemical Industries, Ltd., sometimes abbreviated as "TIPA") were blended under a condition shown in Table 2 to prepare a cement additive (3).

The result is shown in Table 2.

Example 4

A cement additive (4) was prepared in the same manner as in Example 1 except that the copolymer (3) was used instead of the copolymer (2).

The result is shown in Table 2.

Example 5

A cement additive (5) was prepared in the same manner as in Example 1 except that: the copolymer (3) was used instead of the copolymer (2); and blending was performed under a condition shown in Table 2.

The result is shown in Table 2.

Example 6

A cement additive (6) was prepared in the same manner as in Example 3 except that: the copolymer (4) was used instead of the copolymer (2); and blending was performed under a condition shown in Table 2.

The result is shown in Table 2.

Example 7

A cement additive (7) was prepared in the same manner as in Example 1 except that: the copolymer (5) was used instead of the copolymer (2); hydroxyethyldiisopropanolamine (EDIPA, manufactured by Sigma-Aldrich) was used instead of TEA; and blending was performed under a condition shown in Table 2.

The result is shown in Table 2.

Example 8

A cement additive (8) was prepared in the same manner as in Example 1 except that: the copolymer (5) was used instead of the copolymer (2); and blending was performed under a condition shown in Table 2.

The result is shown in Table 2.

Example 9

A cement additive (9) was prepared in the same manner as in Example 1 except that: the copolymer (6) was used instead of the copolymer (2); N,N,N',N'-tetrakis(2-hydroxypropyl)ethylenediamine (THEDA, manufactured by Tokyo Chemical Industry Co., Ltd.) was used instead of TEA; and blending was performed under a condition shown in Table 2.

The result is shown in Table 2.

Example 10

A cement additive (10) was prepared in the same manner as in Example 1 except that the copolymer (7) was used instead of the copolymer (2).

The result is shown in Table 2.

Example 11

A cement additive (11) was prepared in the same manner as in Example 7 except that the copolymer (8) was used instead of the copolymer (5).

The result is shown in Table 2.

Example 12

A cement additive (12) was prepared in the same manner as in Example 7 except that: the copolymer (8) was used instead of the copolymer (5); and blending was performed under a condition shown in Table 2.

The result is shown in Table 2.

Example 13

A cement additive (13) was prepared in the same manner as in Example 1 except that the copolymer (9) was used instead of the copolymer (2).

The result is shown in Table 2.

Comparative Example 1

TEA was used as a cement additive (C1) as shown in Table 2.

The result is shown in Table 2.

Comparative Example 2

The copolymer (2) was used as a cement additive (C2) as shown in Table 2.

The result is shown in Table 2.

Comparative Example 3

A cement additive (C3) was prepared in the same manner as in Example 6 except that: the copolymer (10) was used instead of the copolymer (4); and blending was performed under a condition shown in Table 2.

The result is shown in Table 2.

TABLE 2

| | Cement additive | Polycarboxylic acid-based copolymer (A) | Alkanolamine compound (B) | (B)/(A) (wt %) | Result of Glauber's salt test |
|---|---|---|---|---|---|
| Example 1 | Cement additive (1) | Copolymer (2) | TEA | 100 | ☉ |
| Example 2 | Cement additive (2) | Copolymer (2) | TEA | 500 | ☉ |
| Example 3 | Cement additive (3) | Copolymer (2) | TIPA | 20 | ○ |
| Example 4 | Cement additive (4) | Copolymer (3) | TEA | 100 | ☉ |
| Example 5 | Cement additive (5) | Copolymer (3) | TEA | 50 | ○ |
| Example 6 | Cement additive (6) | Copolymer (4) | TIPA | 100 | ☉ |
| Example 7 | Cement additive (7) | Copolymer (5) | EDIPA | 100 | ☉ |
| Example 8 | Cement additive (8) | Copolymer (5) | TEA | 33 | ○ |
| Example 9 | Cement additive (9) | Copolymer (6) | THEDA | 100 | ☉ |
| Example 10 | Cement additive (10) | Copolymer (7) | TEA | 100 | ☉ |
| Example 11 | Cement additive (11) | Copolymer (8) | EDIPA | 100 | ☉ |
| Example 12 | Cement additive (12) | Copolymer (8) | EDIPA | 33 | ○ |
| Example 13 | Cement additive (13) | Copolymer (9) | TEA | 100 | ☉ |
| Comparative Example 1 | Cement additive (C1) | — | TEA | — | Δ |
| Comparative Example 2 | Cement additive (C2) | Copolymer (2) | — | 0 | X |
| Comparative Example 3 | Cement additive (C3) | Copolymer (10) | TIPA | 100 | ☉ |

Examples 14 to 26

Retention rates were measured by using each of the cement additives (1) to (13) and the copolymer (1) under conditions shown in Table 3.

The results are shown in Table 3.

Comparative Examples 4 to 6

Retention rates were measured by using each of the cement additives (C1) to (C3) and the copolymer (1) under conditions shown in Table 3.

The results are shown in Table 3.

TABLE 3

| | Water-reducing agent | | Cement additive | | Retention rate | | |
|---|---|---|---|---|---|---|---|
| | Kind | Addition amount (wt %/C) | Kind | Addition amount (wt %/C) | 5 min | 30 min | 60 min |
| Example 14 | Copolymer (1) | 0.02 | Cement additive (1) | 0.06 | 100% | 100% | 97% |
| Example 15 | Copolymer (1) | 0.02 | Cement additive (2) | 0.18 | 100% | 99% | 96% |
| Example 16 | Copolymer (1) | 0.02 | Cement additive (3) | 0.18 | 100% | 100% | 99% |
| Example 17 | Copolymer (1) | 0.02 | Cement additive (4) | 0.06 | 100% | 96% | 86% |
| Example 18 | Copolymer (1) | 0.02 | Cement additive (5) | 0.09 | 100% | 96% | 87% |
| Example 19 | Copolymer (1) | 0.02 | Cement additive (6) | 0.06 | 100% | 94% | 92% |
| Example 20 | Copolymer (1) | 0.02 | Cement additive (7) | 0.06 | 100% | 91% | 84% |
| Example 21 | Copolymer (1) | 0.02 | Cement additive (8) | 0.12 | 100% | 91% | 84% |
| Example 22 | Copolymer (1) | 0.02 | Cement additive (9) | 0.06 | 100% | 100% | 95% |
| Example 23 | Copolymer (1) | 0.02 | Cement additive (10) | 0.06 | 100% | 95% | 90% |
| Example 24 | Copolymer (1) | 0.02 | Cement additive (11) | 0.06 | 100% | 92% | 85% |
| Example 25 | Copolymer (1) | 0.02 | Cement additive (12) | 0.12 | 100% | 102% | 99% |
| Example 26 | Copolymer (1) | 0.02 | Cement additive (13) | 0.06 | 100% | 89% | 82% |
| Comparative Example 4 | Copolymer (1) | 0.02 | Cement additive (C1) | 0.03 | 100% | 89% | 79% |
| Comparative Example 5 | Copolymer (1) | 0.02 | Cement additive (C2) | 0.03 | 100% | 100% | 96% |
| Comparative Example 6 | Copolymer (1) | 0.02 | Cement additive (C3) | 0.06 | 100% | 91% | 73% |

As can be seen from Table 2 and Table 3, the cement additive of the present invention can suppress the production of Glauber's salt as a by-product, and in the case where the cement additive of the present invention is used, the cement additive can express excellent retention when turned into a cement composition. In addition, the addition of the polycarboxylic acid-based copolymer (A) as a component of the cement additive of the present invention improved the 28-day compressive strength of the cement composition. Further, a similar result was obtained in a concrete test.

INDUSTRIAL APPLICABILITY

The cement additive of the present invention is suitably used in a cement composition, such as mortar or concrete.

What is claimed is:

1. A cement additive, comprising:
a polycarboxylic acid-based copolymer (A) having a structural unit (I) derived from an unsaturated polyalkylene glycol-based monomer (a) represented by the general formula (1) and a structural unit (II) derived from an unsaturated carboxylic acid-based monomer (b) represented by the general formula (2); and
an alkanolamine compound (B),
wherein a content of the structural unit (II) with respect to a total amount of the structural unit (I) and the structural unit (II) is 60 mol % or less:

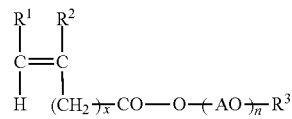

in the general formula (1), $R^1$ and $R^2$ are identical to or different from each other, and each represent a hydrogen atom or a methyl group, $R^3$ represents a hydrogen atom or a hydrocarbon group having 1 to 30 carbon atoms, AO represents an oxyalkylene group having 2 to 18 carbon atoms, n represents an average number of moles added of oxyalkylene groups each represented by AO, and n represents from 1 to 90, and x represents an integer of from 0 to 2;

in the general formula (2), $R^4$ to $R^6$ are identical to or different from one another, and each represent a hydrogen atom, a methyl group, or a $-(CH_2)_z COOM$ group, and the $-(CH_2)_z COOM$ group optionally forms an anhydride with a $-COOX$ group or any other $-(CH_2)_z COOM$ group, z represents an integer of from 0 to 2, M represents a hydrogen atom, an alkali metal, an alkaline earth metal, an ammonium group, an organic ammonium group, or an organic amine group, and X represents a hydrogen atom, an alkali metal, an alkaline earth metal, an ammonium group, an organic ammonium group, or an organic amine group,
wherein the alkanolamine compound (B) is selected from the group consisting of monoethanolamine, diethanolamine, triethanolamine, monoisopropanolamine, diisopropanolamine, triisopropanolamine, methyl ethanolamine, methylisopropanolamine, methyldiisopropanolamine, diethanolisopropanolamine, diisopropanolethanolamine, tetrahydroxyethylethylenediamine, N,N-bis(2-hydroxyethyl)2-propanolamine, N,N-bis(2-hydroxypropyl)-N-(hydroxyethyl)amine, N,N-bis(2-hydroxyethyl)-N-(2-hydroxypropyl)amine, N,N,N',N'-tetra(2-hydroxypropyl)ethylenediamine, N,N,N',N",N"-pentakis(2-hydroxypropyl)diethylenetriamine, and tris(2-hydroxybutyl)amine.

2. The cement additive according to claim 1, wherein the content of the structural unit (II) with respect to the total amount of the structural unit (I) and the structural unit (II) is from 1.0 mol % to 57 mol %.

3. The cement additive according to claim 2, wherein the content is from 10 mol % to 40 mol %.

4. The cement additive according to claim 1, wherein a content of a total amount of the polycarboxylic acid-based copolymer (A) and the alkanolamine compound (B) in the cement additive is from 50 wt % to 100 wt %.

5. The cement additive according to claim 4, wherein the content is from 95 wt % to 100 wt %.

6. The cement additive according to claim 1, wherein a ratio of the alkanolamine compound (B) to the polycarboxylic acid-based copolymer (A) is from 1 wt % to 10,000 wt %.

7. The cement additive according to claim 6, wherein the ratio is from 5 wt % to 300 wt %.

8. The cement additive according to claim 7, wherein the ratio is from 10 wt % to 150 wt %.

9. The cement additive according to claim 1, wherein a weight-average molecular weight of the polycarboxylic acid-based copolymer (A) is 10,000 or more.

10. The cement additive according to claim 9, wherein the weight-average molecular weight is from 20,000 to 300,000.

11. The cement additive according to claim 1, wherein n in the general formula (1) represents from 3 to 60.

12. A cement composition, comprising the cement additive of claim 1.

13. A raw material for a cement additive, the raw material comprising the polycarboxylic acid-based copolymer (A) of claim 1, wherein the raw material is used in the cement additive of claim 1.

14. A raw material for a cement additive, the raw material comprising the alkanolamine compound (B) of claim 1, wherein the raw material is used in the cement additive of claim 1.

* * * * *